United States Patent
Hsu et al.

(10) Patent No.: US 8,829,947 B1
(45) Date of Patent: Sep. 9, 2014

(54) HIGH VOLTAGE PROTECTION APPARATUS AND METHOD

(71) Applicant: Taiwan Semiconductor Manufacturing Co., Ltd., Hsin-Chu (TW)

(72) Inventors: Wen-Yang Hsu, Kaohsiung (TW); Chien-Yuan Lee, Zhubei (TW)

(73) Assignee: Taiwan Semiconductor Manufacturing Co. Ltd., Hsin-Chu (TW)

( * ) Notice: Subject to any disclaimer, the term of this patent is extended or adjusted under 35 U.S.C. 154(b) by 0 days.

(21) Appl. No.: 13/803,325

(22) Filed: Mar. 14, 2013

Related U.S. Application Data

(60) Provisional application No. 61/777,166, filed on Mar. 12, 2013.

(51) Int. Cl.
H03B 1/00 (2006.01)
H02H 3/20 (2006.01)

(52) U.S. Cl.
CPC ...................................... *H02H 3/20* (2013.01)
USPC ............................. 327/108; 327/333; 327/427

(58) Field of Classification Search
USPC ............... 327/77, 78, 87, 108, 112, 323, 324, 327/327, 333, 427; 326/80–83; 361/90, 361/91.1, 91.5
See application file for complete search history.

(56) References Cited

U.S. PATENT DOCUMENTS 6,407,581 B1 * 6/2002 Hull et al. ........................ 326/83
2010/0141324 A1 * 6/2010 Wang et al. .................... 327/333

* cited by examiner

*Primary Examiner* — Long Nguyen
(74) *Attorney, Agent, or Firm* — Duane Morris LLP

(57) ABSTRACT

An apparatus includes first and second switches. The first switch is for coupling a first node to a second node responsive to a first control signal having a first value, and for decoupling these nodes responsive to the first control signal having a second value. The second switch is for coupling the first node to a third node responsive to a second control signal having the first value, and for decoupling these nodes responsive to the second control signal having the second value. A load is coupled between the second and third nodes. A detection circuit coupled to the first node is configured to generate a signal indicating whether voltage at the first node exceeds a threshold. First and second modules are configured to set the first and second control signals to the second value responsive to the signal indicating that the voltage at the first node exceeds the threshold.

20 Claims, 3 Drawing Sheets

HIGH VOLTAGE PROTECTION APPARATUS AND METHOD

CROSS-REFERENCE TO RELATED APPLICATION

This application claims priority under 35 U.S.C. §119(e) from co-pending Provisional Application Ser. No. 61/777,166, filed Mar. 12, 2013, the entirety of which is hereby incorporated by reference herein.

BACKGROUND

In various circuit contexts and applications, circuit components are designed to operate without sustaining damage in a specified range of voltages (e.g., a certain safe operating area or SOA). When a wide voltage swing is expected or possible at one location in a circuit, components at various locations in the circuit can sustain damage if they are left unprotected. For example, a voltage range between −60 V and +60 V can damage transistors such as laterally diffused metal oxide semiconductor (LDMOS) transistors that have a relatively low oxide break-down voltage of about 5V. Some approaches for addressing such voltage swing concerns have used bulk diodes made using high voltage silicon-on-insulator (HV SOI) fabrication processes that prevent leakage through such bulk diodes, or have used specially designed high voltage isolation diodes.

BRIEF DESCRIPTION OF THE DRAWINGS

The following will be apparent from elements of the figures, which are provided for illustrative purposes and are not necessarily to scale.

DETAILED DESCRIPTION

This description of certain exemplary embodiments is intended to be read in connection with the accompanying drawings, which are to be considered part of the entire written description. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Likewise, terms concerning electrical coupling and the like, such as "coupled," "connected" and "interconnected," refer to a relationship wherein structures communicate with one another either directly or indirectly through intervening structures unless expressly described otherwise.

Various embodiments of the present disclosure protect circuitry from damage in the event of wide voltage swings without the need for high voltage silicon-on-insulator (HV SOI) processes or high voltage isolation diodes. Avoiding the need for HV SOI processes is advantageous because devices from a bipolar-CMOS-DMOS (BCD) process may instead be used, which may be easier or less expensive from a manufacturing standpoint. With the use of high voltage detection circuitry and control circuitry for disabling current flow in certain conditions, circuit components are protected in some embodiments even when wide voltage swings are present at circuit elements such as output pins. For example, various embodiments may be used with the FlexRay automotive network communications protocol, according to which transmitter circuits use a differential signaling buffer to drive a resistive load (e.g., 40 to 50 ohms) to a specific voltage swing, e.g., −1 V to +1 V. During reliability testing, FlexRay circuitry may experience voltage swings from −60 V to +60 V. Various other circuit applications and voltage swings may be handled by embodiments as well. Problems associated with leakage paths from bulk diodes in FlexRay circuits are avoided in various embodiments, e.g., with the use of unidirectional conduction devices that block leakage currents.

Figure 1:
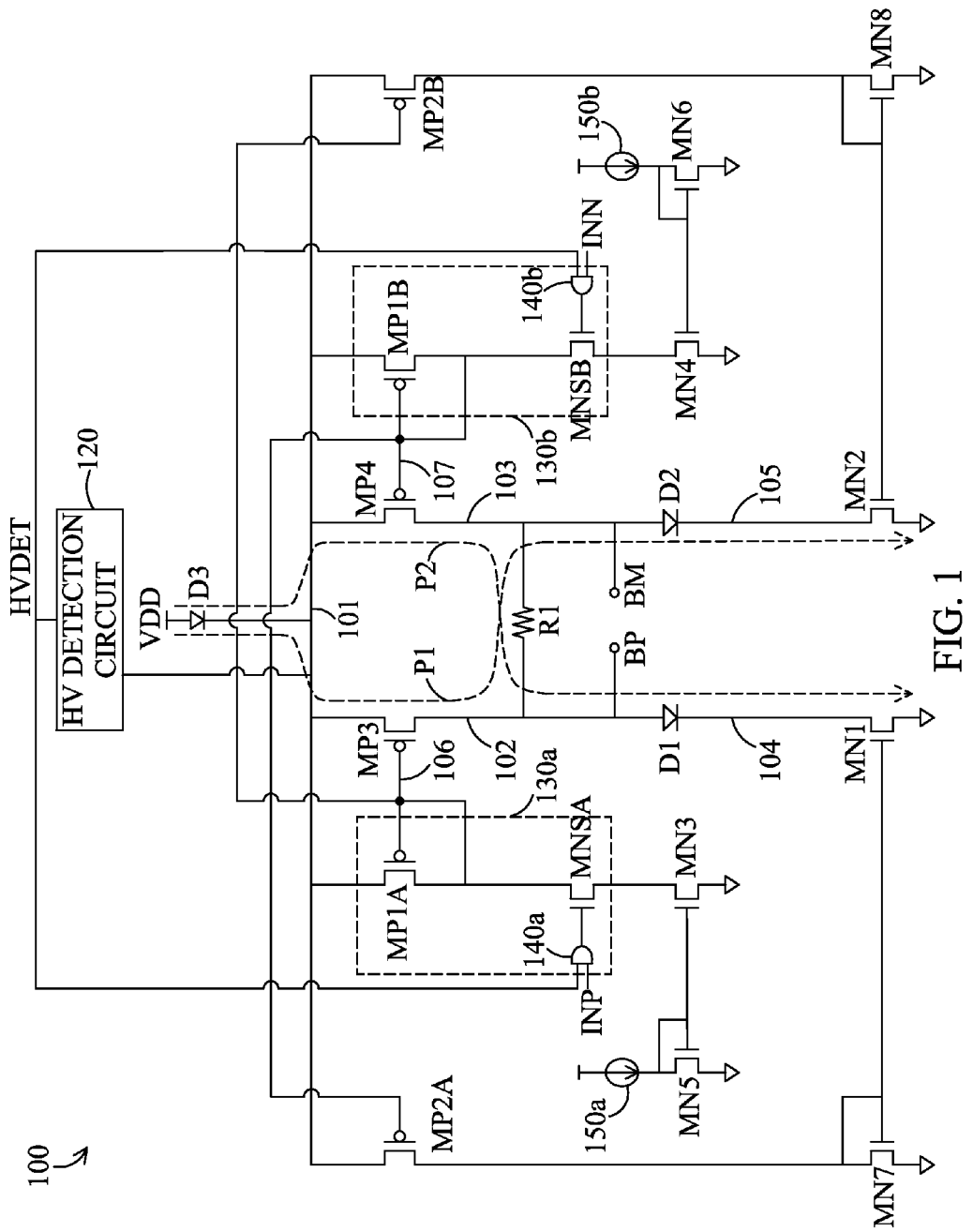
FIG. 1 is a schematic diagram of a circuit in accordance with some embodiments of the present disclosure.

FIG. 1 is a schematic diagram of a circuit in accordance with some embodiments of the present disclosure. Circuit 100 has inputs INP and INN and output pins BP and BM. In some embodiments, INN is the logical complement (i.e., inverted logical value) of INP. Unidirectional conduction devices D1, D2, and D3 permit current to flow in one specified direction (e.g., from top to bottom in the view of FIG. 1). In some embodiments, devices D1, D2, and D3 are diodes or diode-connected metal oxide semiconductor (MOS) transistors. Device D3 allows current to flow from a power supply node (shown as VDD) to node 101. Switches MP3 and MP4, which may be pull-up devices implemented as PMOS transistors, are configured to selectively couple node 101 to nodes 102 and 103, respectively. A load is coupled between nodes 102 and nodes 103. Although a resistor R1 is shown as the load in this example, various types of load may be used. Device D1 allows current to flow from node 102 to node 104, and device D2 allows current to flow from node 103 to node 105. Switches MN1 and MN2 may be pull-down devices implemented as NMOS transistors. Switch MN1 selectively couple node 104 to a ground node, and switch MN2 selectively couples node 105 to the ground node.

High voltage detection circuit 120 is configured to generate a detection signal HVDET that indicates whether the voltage at node 101 is greater than a predetermined threshold, e.g., higher than 20 V for FlexRay applications. For example, detection circuit 120 may output HVDET='1' (logical HIGH value, such as VDD=5 V) when the voltage at node 101 is less than the predetermined threshold (a normal operating condition), and may output HVDET='0' (logical low value, such as ground or 0 V) when the voltage at node 101 is greater than the predetermined threshold (e.g., a potentially unsafe condition). Additional details of detection circuit 120 are discussed below in the context of FIG. 2.

The operation of circuit 100 is understood by considering various input cases. Suppose INP='1', INN='0', and HVDET='1'. Then the output of AND gate 140a is logical voltage value '1', so switching transistor MNSA is on (conducts current between its source and drain terminals). In other words, the switch MNSA is closed due to INP and HVDET both being '1'. Various types of logic circuits besides an AND gate may be used in various implementations. With the current mirror configuration of NMOS transistors MN5 and MN3 and current source 150a, transistors MNSA and MN3 provide a path to ground that pulls down the voltage at node 106, thus turning on PMOS transistor MP3. The output of logic circuit 140b is '0', so switching transistor MNSB is off (not conducting between source and drain terminals). In other words, the switch MNSB is open due to INN being '0' and HVDET being '1'. Thus, the logical voltage value at node 107, which is '1' (due to the drain-gate coupling of transistor MP1B) and has turned off transistor MP1B, is not pulled down. PMOS transistor MP2A has its gate coupled to node 107 and is turned off, and PMOS transistor MP4 is also similarly turned off. The logical voltage value of gate of MN7 is '0' due to the drain-gate coupling of that transistor, so NMOS transistor MN1 is off. PMOS transistor MP2B is on due to node 106 being low. Consequently, the gate of NMOS transistor MN2 is pulled high by transistor MP2B, thereby turning on transistor MN2. Therefore, current flows along path P1 in this scenario.

Suppose instead that INP='0', INN='1', and HVDET='1'. Then the output of logic circuit 140b is '1', and as a result transistor MNSB is on. Transistors MNSB and MN4 provide a path to ground that pulls down node 107 and thus turns on PMOS transistor MP4. Because INP='0', the output of logic circuit 140a is '0', which causes transistor MNSA to be off. Consequently, node 106 is not pulled down. Thus, PMOS transistors MP2B and MP3 are off. Because the gate and drain of NMOS transistor MN8 are tied together, the gate of transistor MN8 is at logical voltage value '0', so NMOS transistor MN2 is off. Because node 107 is at logical voltage value '0', PMOS transistor MP2A is on and pulls up the gate of NMOS transistor MN1, thereby turning on transistor MN1. Therefore, current flows along path P2 in this scenario.

Thus, depending on the input signal INP, one of transistors (MP3, MP4) is on and the other is off, and consequently current flows across resistor R1 in one direction or the other. Devices D1 and D2 block leakage in the opposite direction of paths P1, P2. Suppose INP='1' so that transistor MP3 is on and current is flowing along path P1. A relatively high, potentially unsafe voltage at output pin BM (e.g., higher than a predetermined threshold such as +20 V) that might otherwise cause damage to circuit components is safely handled as follows. High voltage detection circuit 120, which has an input coupled to node 101, detects that the voltage at node 101 is higher (due to conduction by transistor MP3) than the predetermined threshold, and accordingly generates its output HVDET='0'. Module 130a, which includes transistors MP1A and MNSA and logic circuit 140a, controls the voltage at node 106 based on HVDET and the input signal INP. Transistor MNSA is turned off in this case and does not pull down node 106. Node 106, which was previously at logical voltage value '0', rises in voltage and turns off transistor MP3.

Similarly, in the case that INP='0' so that transistor MP4 is on and current is flowing along path P2, a relatively high voltage (e.g., a voltage greater than +20 V) at output pin BP will cause detection circuit 120 to provide signal HVDET='0' to module 130b. Consequently, switching transistor MNSB turns off, which causes transistor MP4 to be turned off. Thus, in either input case, when the voltage at output pin BP swings between a wide voltage range (e.g., between −60 V and +60 V), the gate-source voltage values of various transistors are maintained below VDD and thus in a safe operating area (SOA) such as 0 to +5 V.

Figure 2:
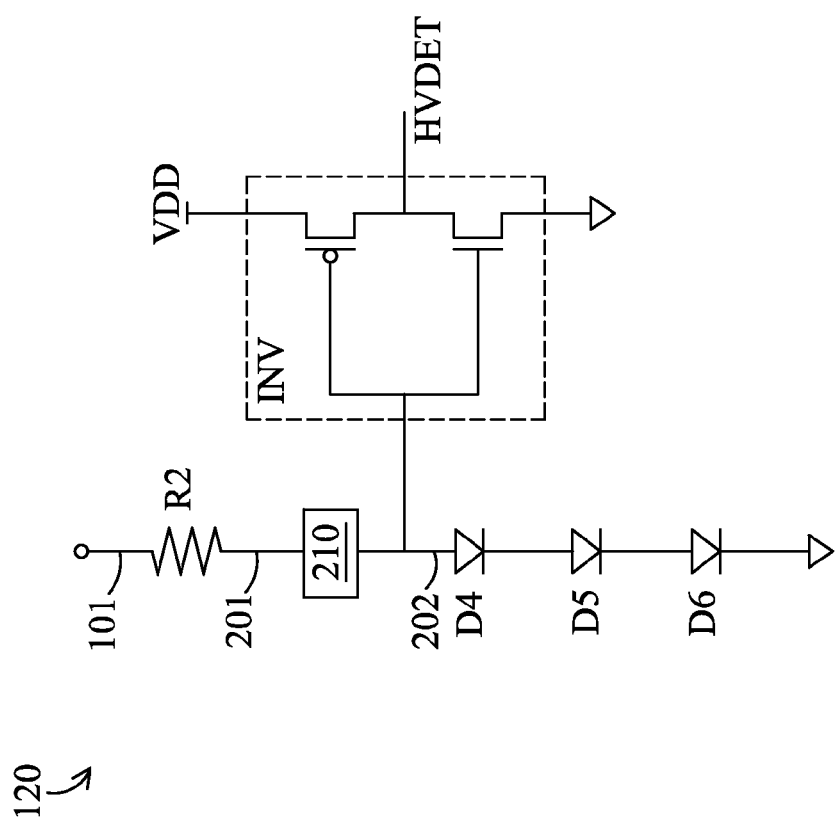
FIG. 2 is a schematic diagram of a high voltage detection circuit in accordance with some embodiments.

FIG. 2 is a schematic diagram of high voltage detection circuit 120 in accordance with some embodiments. A resistor R2 and a device 210 are coupled in series. Device 210 is a device which turns on (e.g., to permit current to flow from node 201 to node 202) when the voltage applied to the device is greater than a predetermined voltage threshold. The predetermined voltage threshold at which device 210 turns on is a relatively high voltage (e.g., a higher voltage than a turn-on voltage threshold of NMOS transistors in circuit 100) and is determined according to application specifications. In some embodiments, device 210 is a zener diode, a diode string, or the like. For example, in an implementation where device 210 is a zener diode, the cathode of the zener diode 210 is coupled to node 201, and the anode of the zener diode 210 is coupled to node 202. One or more series-coupled unidirectional conduction devices D4, D5, D6 (e.g., diodes or diode-connected MOS transistors) enforce current flow in a single direction (e.g., top to bottom in the view of FIG. 2) from node 202 to ground. An inverter INV, which may be a CMOS inverter configured as shown in FIG. 2, inverts the logical voltage value of node 202 to yield output signal HVDET. During normal operation, when the voltage at node 101 is less than a predetermined threshold (e.g., about 20 V), node 202 is at logical low voltage, and HVDET='1'. If a sufficiently high voltage is applied at node 101, device 210 is turned on to permit current to flow from node 201 to node 202. For example, if device 210 is a zener diode, breakdown occurs at zener diode 210 when a sufficiently high voltage is applied at node 101, and the associated breakdown current in the reverse biased mode forces node 202 to the logical voltage value '1', which causes HVDET to be set to '0'.

Figure 3:
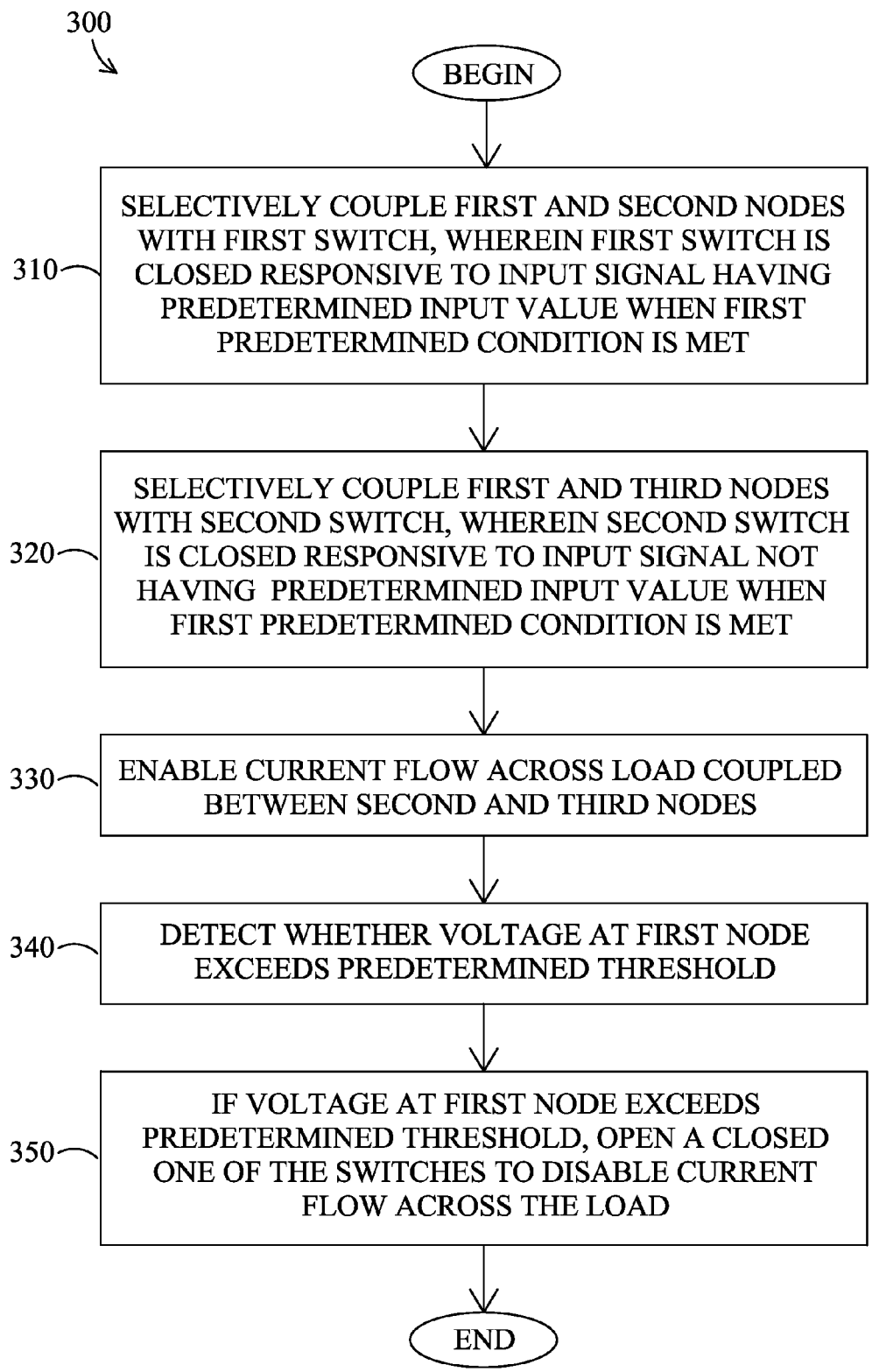
FIG. 3 is a flow diagram of a process in accordance with some embodiments.

FIG. 3 is a flow diagram of a process in accordance with some embodiments. A first node (e.g., node 101) is selectively coupled (310) to a second node (e.g., node 102) with a first switch (e.g., switch MP3). The first switch is closed responsive to an input signal (e.g., signal INP) having a predetermined input value (e.g., '1') when a first predetermined condition is met (e.g., the first predetermined condition may be that the voltage at node 101 does not exceed a predetermined threshold such as 20 V). The first node is selectively coupled (320) to a third node (e.g., node 103) with a second switch (e.g., switch MP4). The second switch is closed responsive to the input signal not having the predetermined input value when the first predetermined condition is met. Current flow is enabled (330) across a load (e.g., resistor R1) coupled between the second and third nodes. Process 300 includes detecting (340) whether the voltage at the first node exceeds the predetermined threshold. If the voltage at the first node exceeds the predetermined threshold, a closed one of the switches is opened (350), to disable the current flow across the load.

In some embodiments, an apparatus includes first and second switches (e.g., transistors MP3 and MP4, respectively). The first switch is for coupling a first node (e.g., node 101) to a second node (e.g., node 102) responsive to a first control signal having a first value (e.g., voltage at node 106 having the logical value '1'), and for decoupling the first node from the second node responsive to the first control signal having a second value (e.g., voltage at node 106 having the logical value '0'). The second switch is for coupling the first node to a third node (e.g., node 103) responsive to a second control signal (e.g., voltage at node 107) having the first value, and for decoupling the first node from the third node responsive to the second control signal having the second value. A load (e.g., resistor R1) is coupled between the second and third nodes. The apparatus includes a high voltage detection circuit (e.g., detection circuit 120) coupled to the first node. The high voltage detection circuit is configured to generate a detection signal (e.g., detection signal HVDET) indicating whether a voltage at the first node exceeds a predetermined threshold. The apparatus includes first and second modules (e.g., modules 130a and 130b, respectively) configured to set the first and second control signals, respectively, to the second value responsive to the detection signal indicating that the voltage at the first node exceeds the predetermined threshold.

In some embodiments, an apparatus includes first, second, and third unidirectional conduction devices (e.g., devices D3, D1, and D2, respectively), first, second, third, and fourth switches (e.g., transistors MP3, MP4, MN1, and MN2, respectively), and a control circuit (e.g., a circuit including detection circuit 120 and modules 130a and 130b). The first unidirectional conduction device is coupled between a positive power supply node (e.g., VDD) and a first node (e.g., node 101), to permit current to flow from the positive power supply node to the first node. The first switch is for selectively coupling the first node to a second node (e.g., node 102), and the second switch is for selectively coupling the first node to a third node (e.g., node 103). A load (e.g., resistor R1) is coupled between the second and third nodes. The second unidirectional conduction device is coupled between the second node and a fourth node (e.g., node 104), to permit current to flow from the second node to the fourth node. The third unidirectional conduction device is coupled between the third node and a fifth node (e.g., node 105), to permit current to flow from the third node to the fifth node. The third switch is for selectively coupling the fourth node to a ground node, and the fourth switch is for selectively coupling the fifth node to the ground node. The control circuit is configured to open a closed one of said first and second switches responsive to a voltage at the first node exceeding a predetermined value.

In some embodiments, a method includes selectively coupling a first node (e.g., node 101) to a second node (e.g., node 102) with a first switch (e.g., switch MP3). The first switch is closed responsive to an input signal (e.g., signal INP) having a predetermined input value (e.g., '1') when a first predetermined condition is met (e.g., the first predetermined condition may be that the voltage at node 101 does not exceed a predetermined threshold such as 20 V). The first node is selectively coupled to a third node (e.g., node 103) with a second switch (e.g., switch MP4). The second switch is closed responsive to the input signal not having the predetermined input value when the first predetermined condition is met. Current flow is enabled across a load (e.g., resistor R1) coupled between the second and third nodes. The method includes detecting whether the voltage at the first node exceeds the predetermined threshold. If the voltage at the first node exceeds the predetermined threshold, a closed one of the switches is opened, to disable the current flow across the load.

Although examples are illustrated and described herein, embodiments are nevertheless not limited to the details shown, since various modifications and structural changes may be made therein by those of ordinary skill within the scope and range of equivalents of the claims.

What is claimed is:

1. An apparatus comprising:
a first switch for coupling a first node to a second node responsive to a first control signal having a first value, and for decoupling the first node from the second node responsive to the first control signal having a second value;
a second switch for coupling the first node to a third node responsive to a second control signal having the first value, and for decoupling the first node from the third node responsive to the second control signal having the second value, wherein a load is coupled between the second and third nodes;
a high voltage detection circuit coupled to the first node, wherein the high voltage detection circuit is configured to generate a detection signal indicating whether a voltage at the first node exceeds a predetermined threshold; and
first and second modules configured to set the first and second control signals, respectively, to the second value responsive to the detection signal indicating that the voltage at the first node exceeds the predetermined threshold.

2. The apparatus of claim 1, wherein:
the first and second switches are first and second PMOS transistors, respectively;
sources of the first and second PMOS transistors are coupled to the first node;
a drain of the first PMOS transistor is coupled to the second node;
a drain of the second PMOS transistor is coupled to the third node; and
gates of the first and second PMOS transistors are coupled to receive the first and second control signals, respectively.

3. The apparatus of claim 2, wherein:
the first module includes a first NMOS transistor having a drain coupled to the gate of the first PMOS transistor; and
the second module includes a second NMOS transistor having a drain coupled to the gate of the second PMOS transistor.

4. The apparatus of claim 3, wherein:
the first module further includes a third PMOS transistor having a gate coupled to the gate of the first PMOS transistor, a source coupled to the first node, and a drain coupled to the drain of the first NMOS transistor; and
the second module further includes a fourth PMOS transistor having a gate coupled to the gate of the second PMOS transistor, a source coupled to the first node, and a drain coupled to the drain of the second NMOS transistor.

5. The apparatus of claim 3, wherein:
the first module further includes a first logic circuit having an output node coupled to a gate of the first NMOS transistor, wherein the first logic circuit is configured to provide a logical high voltage value at said output node in response to an input signal having a first value and the detection signal indicating that the voltage at the first node does not exceed the predetermined threshold; and
the second module further includes a second logic circuit having an output node coupled to a gate of the second NMOS transistor, wherein the second logic circuit is configured to provide a logical high voltage value at said output node in response to the input signal having a second value and the detection signal indicating that the voltage at the first node does not exceed the predetermined threshold.

6. The apparatus of claim 1, wherein the high voltage detection circuit includes:
a resistor coupled between the first node and a fourth node;
a device coupled between the fourth node and a fifth node, wherein the device is configured to turn on when a voltage difference from the fourth node to the fifth node is greater than a first voltage;
one or more diodes for conducting current unidirectionally from the fifth node to a ground node, wherein said one or more diodes do not include the device; and
an inverter for inverting a logical voltage value of the fifth node.

7. The apparatus of claim 1, further comprising:
a first unidirectional conduction device coupled between a positive power supply node and the first node, to permit current to flow from the positive power supply node to the first node;
a second unidirectional conduction device coupled between the second node and a fourth node, to permit current to flow from the second node to the fourth node; and
a third unidirectional conduction device coupled between the third node and a fifth node, to permit current to flow from the third node to the fifth node.

8. The apparatus of claim 7, wherein the first and second switches are first and second PMOS transistors, respectively, said apparatus further comprising:
- a third PMOS transistor having a gate coupled to a gate of the second PMOS transistor, and a source coupled to the first node;
- a fourth PMOS transistor having a gate coupled to a gate of the first PMOS transistor, and a source coupled to the first node;
- a first NMOS transistor having a gate coupled to a drain of the third PMOS transistor, and a drain coupled to the fourth node; and
- a second NMOS transistor having a gate coupled to a drain of the fourth PMOS transistor, and a drain coupled to the fifth node.

9. An apparatus comprising:
- a first unidirectional conduction device coupled between a positive power supply node and a first node, to permit current to flow from the positive power supply node to the first node;
- a first switch for selectively coupling the first node to a second node;
- a second switch for selectively coupling the first node to a third node, wherein a load is coupled between the second and third nodes;
- a second unidirectional conduction device coupled between the second node and a fourth node, to permit current to flow from the second node to the fourth node;
- a third unidirectional conduction device coupled between the third node and a fifth node, to permit current to flow from the third node to the fifth node;
- a third switch for selectively coupling the fourth node to a ground node;
- a fourth switch for selectively coupling the fifth node to the ground node; and
- a control circuit configured to open a closed one of said first and second switches responsive to a voltage at the first node exceeding a predetermined threshold.

10. The apparatus of claim 9, wherein said apparatus is configured to conduct current in a first direction across the load when an input signal has a first value, and conduct current in a second direction across the load when the input signal has a second value.

11. The apparatus of claim 9, wherein:
- the first switch is a first PMOS transistor having a source coupled to the first node and a drain coupled to the second node;
- the second switch is a second PMOS transistor having a source coupled to the first node and a drain coupled to the third node;
- the third switch is a first NMOS transistor having a drain coupled to the fourth node and a source coupled to the ground node; and
- the fourth switch is a second NMOS transistor having a drain coupled to the fifth node and a source coupled to the ground node.

12. The apparatus of claim 9, wherein the control circuit includes a high voltage detection circuit coupled to the first node, wherein the high voltage detection circuit is configured to generate a detection signal indicating whether the voltage at the first node exceeds the predetermined threshold.

13. The apparatus of claim 12, wherein the first and second switches are first and second PMOS transistors, respectively, the third and fourth switches are first and second NMOS transistors respectively, and the control circuit further includes:
- a third NMOS transistor having a drain coupled to a gate of the first PMOS transistor; and
- a fourth NMOS transistor having a drain coupled to a gate of the second PMOS transistor.

14. The apparatus of claim 13, wherein the control circuit further includes:
- a third PMOS transistor having a gate coupled to the gate of the first PMOS transistor, a source coupled to the first node, and a drain coupled to the drain of the third NMOS transistor; and
- a fourth PMOS transistor having a gate coupled to the gate of the second PMOS transistor, a source coupled to the first node, and a drain coupled to the drain of the fourth NMOS transistor.

15. The apparatus of claim 13, wherein the control circuit further includes:
- a first logic circuit having an output coupled to a gate of the third NMOS transistor, wherein the first logic circuit is configured to provide a logical high voltage value at said output of said first logic circuit in response to an input signal having a first value and the detection signal indicating that the voltage at the first node does not exceed the predetermined threshold; and
- a second logic circuit having an output coupled to a gate of the fourth NMOS transistor, wherein the second logic circuit is configured to provide a logical high voltage value at said output of said second logic circuit in response to the input signal having a second value and the detection signal indicating that the voltage at the first node does not exceed the predetermined threshold.

16. The apparatus of claim 12, wherein the high voltage detection circuit includes:
- a resistor coupled between the first node and a sixth node;
- a device coupled between the sixth node and a seventh node, wherein the device is configured to turn on when a voltage difference from the sixth node to the seventh node is greater than a first voltage;
- one or more diodes for conducting current unidirectionally from the seventh node to the ground node, wherein said one or more diodes do not include the zener diode; and
- an inverter for inverting the logical voltage value of the seventh node.

17. The apparatus of claim 9, wherein the first and second switches are first and second PMOS transistors, respectively, and the third and fourth switches are first and second NMOS transistors respectively, said apparatus further comprising:
- a third PMOS transistor having a gate coupled to a gate of the second PMOS transistor, a source coupled to the first node, and a drain coupled to a gate of the first NMOS transistor;
- a fourth PMOS transistor having a gate coupled to a gate of the first PMOS transistor, a source coupled to the first node, and a drain coupled to a gate of the second NMOS transistor.

18. A method comprising:
- selectively coupling a first node to a second node with a first switch, wherein the first switch is closed responsive to an input signal having a predetermined input value when a predetermined condition is met;
- selectively coupling the first node to a third node with a second switch, wherein the second switch is closed responsive to the input signal not having the predetermined input value when the predetermined condition is met;
- enabling current flow across a load coupled between the second and third nodes;

detecting whether a voltage at the first node exceeds a predetermined threshold, wherein the predetermined condition is that the voltage at the first node does not exceed the predetermined threshold; and if the voltage at the first node exceeds the predetermined threshold, opening a closed one of said switches, to disable the current flow across the load.

19. The method of claim 18, wherein said detecting comprises:

providing a resistor coupled between the first node and a fourth node;

conducting current from the fourth node to a fifth node with a first device responsive to a voltage difference from the fourth node to the fifth node being greater than a first voltage;

conducting current unidirectionally from the fifth node to a ground node with one or more diodes; and inverting a logical voltage value of the fifth node to provide a detection signal indicating whether the voltage at the first node exceeds the predetermined threshold.

20. The method of claim 19, further comprising:

unidirectionally conducting current from a positive power supply node to the first node with a second device;

unidirectionally conducting current from the second node to a sixth node with a third device; and unidirectionally conducting current from the third node to a seventh node with a fourth device.

\* \* \* \* \*